(12) United States Patent
Eu (10) Patent No.: US 7,458,336 B2
(45) Date of Patent: Dec. 2, 2008

(54) ANIMAL IDENTIFICATION AND ENTRY CONTROL SYSTEM FOR FEEDING PURPOSES

(76) Inventor: Philip Stephen Eu, 224 E. 52 St., New York, NY (US) 10022

( * ) Notice: Subject to any disclaimer, the term of this patent is extended or adjusted under 35 U.S.C. 154(b) by 432 days.

(21) Appl. No.: 11/123,731

(22) Filed: May 7, 2005

(65) Prior Publication Data

US 2006/0249088 A1   Nov. 9, 2006

(51) Int. Cl.
*A01K 1/10* (2006.01)
*A01K 5/00* (2006.01)
*A01K 39/00* (2006.01)

(52) U.S. Cl. .................. 119/51.02; 119/51.01; 119/62; 119/484; 119/163

(58) Field of Classification Search .................. 119/161, 119/163, 165, 51.2, 62, 51.01, 61.1, 59, 51.12, 119/51.11, 54, 51.1, 63, 52.3, 52.4, 53.5, 119/484, 75, 416, 482, 51.02, 900, 494, 481; D30/108, 119, 121, 129–131, 133, 132

See application file for complete search history.

(56) References Cited

U.S. PATENT DOCUMENTS

| | | | |
|---|---|---|---|
| 2,836,150 A * | 5/1958 | Robinson | ..................... 119/53 |
| 3,121,419 A | 2/1964 | Gillespie | |
| 3,176,656 A | 4/1965 | Bates | |
| 3,260,034 A | 7/1966 | Major | |
| 3,301,219 A | 1/1967 | Hellekson | |
| 3,465,724 A | 9/1969 | Broadbent | |
| 3,557,757 A | 1/1971 | Brooks | |
| 3,557,758 A | 1/1971 | Lack | |
| 3,575,141 A | 4/1971 | Elkins | |
| 3,897,753 A | 8/1975 | Lee et al. | |
| 4,022,263 A * | 5/1977 | Beckett et al. | ................. 160/92 |
| 4,036,178 A | 7/1977 | Lee et al. | |
| 4,162,683 A | 7/1979 | Brooks | |
| 4,175,516 A | 11/1979 | Savage | |
| 4,188,912 A | 2/1980 | Smalley | |
| 4,216,743 A | 8/1980 | Cohen | |
| 4,389,976 A | 6/1983 | Novak | |

(Continued)

FOREIGN PATENT DOCUMENTS

DE     9201080 U     3/1992

(Continued)

*Primary Examiner*—Andrea M Valenti
(74) *Attorney, Agent, or Firm*—Scott Lefton (57) ABSTRACT

There is disclosed an animal identification, feeding and entry control system based on a radio frequency identification (RFID) system including an animal collar-mounted RFID tag, and RFID circuitry including a single antenna housed within a bezel placed forward of and surrounding the entry aperture to optimize signal reception. The bezel shape allows only one animal to enter at a time. To conserve power, the circuitry is only activated when an animal pushes against a door within the device, triggering a switch mechanism. A circuit-controlled latch prevents animals from opening the door unless a code match is detected between the programmed code in the tag and a stored code in the circuit controlling the system. Multiple codes may be stored for identifying multiple animals wearing collars tagged with unique identifying codes. The system's applications include but are not limited to controlling animal entry to feeding enclosures, human housing and animal housing.

21 Claims, 8 Drawing Sheets

U.S. PATENT DOCUMENTS

| | | | | |
|---|---|---|---|---|
| 4,421,058 A * | 12/1983 | Paul | | 119/484 |
| 4,461,241 A | 7/1984 | Ostler | | |
| 4,463,706 A | 8/1984 | Meister et al. | | |
| 4,497,133 A | 2/1985 | Blenkinsop | | |
| 4,517,923 A | 5/1985 | Palmer | | |
| 4,532,892 A | 8/1985 | Kuzara | | |
| 4,572,108 A | 2/1986 | Daifotes | | |
| 4,655,170 A | 4/1987 | DaSilva | | |
| 4,691,664 A * | 9/1987 | Crowell | | 119/61.52 |
| 4,793,290 A | 12/1988 | O'Donnell | | |
| 4,798,173 A | 1/1989 | Wilgren | | |
| 4,798,175 A | 1/1989 | Townsend et al. | | |
| 4,991,350 A * | 2/1991 | Kirk | | 49/169 |
| 5,177,900 A | 1/1993 | Soloweij | | |
| 5,309,864 A | 5/1994 | Harmsen et al. | | |
| 5,349,925 A | 9/1994 | Zerato et al. | | |
| 5,492,083 A | 2/1996 | Holladay | | |
| 5,669,328 A | 9/1997 | Lanfranchi | | |
| 5,701,702 A | 12/1997 | Reid et al. | | |
| 5,709,169 A | 1/1998 | Ryles | | |
| 5,740,757 A | 4/1998 | Smeester | | |
| 5,826,538 A | 10/1998 | Roybal | | |
| 5,852,987 A * | 12/1998 | Lamp, Jr. | | 119/62 |
| 5,954,011 A * | 9/1999 | Martinez | | 119/62 |
| 5,992,096 A | 11/1999 | De La Cerda et al. | | |
| 6,044,795 A | 4/2000 | Matsuura et al. | | |
| 6,141,911 A | 11/2000 | Reid | | |
| 6,349,671 B1 | 2/2002 | Lewis et al. | | |
| 6,446,574 B2 * | 9/2002 | Bickley | | 119/55 |
| 6,622,656 B1 | 9/2003 | Splane | | |
| 6,700,547 B2 * | 3/2004 | Mejia et al. | | 343/743 |
| 2001/0032594 A1 | 10/2001 | Bickley | | |
| 2005/0061252 A1 * | 3/2005 | Meeks et al. | | 119/51.02 |
| 2005/0217591 A1 * | 10/2005 | Turner et al. | | 119/51.02 |
| 2005/0284382 A1 * | 12/2005 | Stantchev et al. | | 119/51.02 |
| 2005/0284402 A1 * | 12/2005 | Becker | | 119/484 |
| 2006/0252366 A1 * | 11/2006 | Eu | | 455/3.06 |
| 2007/0051317 A1 * | 3/2007 | Bruner | | 119/53 |

FOREIGN PATENT DOCUMENTS

| | | |
|---|---|---|
| DE | 19952987 | 5/2000 |
| FR | 2623688 A1 * | 6/1989 |
| GB | 1576318 | 10/1980 |
| GB | 1577023 | 10/1980 |
| GB | 2262697 | 6/1993 |
| GB | 2305211 | 4/1997 |
| GB | 2393245 | 3/2004 |
| WO | WO-97/31525 | 9/1997 |

* cited by examiner

ID
ANIMAL IDENTIFICATION AND ENTRY CONTROL SYSTEM FOR FEEDING PURPOSES

CROSS REFERENCE TO RELATED APPLICATION

Animal identification and entry control system application Ser. No. 11/123,583.

STATEMENT REGARDING FEDERALLY SPONSORED RESEARCH OR DEVELOPMENT

N/A

BACKGROUND

The present invention relates generally to animal entry systems, and more specifically to a radio frequency identification (RFID) based system for controlling pet access to specific doorways and enclosed structures, particularly animal feeders. It would be generally desirable for animal feeders to have the capability to recognize and allow entry to specific animals and also to deny entry to all other animals. It would also be generally desirable for these entry systems to be easily taught or programmed to recognize specific animals, and to then operate independently, safely and reliably without the need for frequent maintenance including battery changes.

There are numerous pet access control systems in existence, many of which are capable of identifying one or more specific animals. Some of these access control systems identify the specific animals by using radio signals sent to and from suitably constructed identification collars, while others use identifying means including magnets or infra-red transmitters embedded in animal collars.

The non-radio-based animal identification systems uniformly suffer from range and orientation problems, where the magnetic based systems must have the magnet extremely close to the sensor to work. Infra-red systems require a clear line-of-sight, thus making reliable operation of infra-red based animal identification systems difficult.

The older radio-based animal identification systems were based on purely analog circuitry, and many of these systems were designed to excite an analog resonant circuit element worn by an animal and to detect the analog signal resulting from the excitation of this element. This type of circuit was dependent on the tuning of an oscillator and the tuning of the resonant element, and was also very sensitive to antenna orientation and distance, and as such was not robust. Aside from the difficulties in maintaining sufficient tuning accuracy, these systems required much more complex tuned circuitry in order to identify multiple specific animals. The circuits also were generally designed to run continuously, and as such were very power-inefficient.

One example of a purely analog circuit-based animal identification and entry control system is taught by U.S. Pat. No. 4,497,133 filed Feb. 5, 1995 entitled PET DOOR WITH CONTROL CIRCUIT THEREFOR which discloses a pet door with a control circuit whose ability to recognize a passive radio frequency ID element depends on the use of a specific resistor in the circuit. This resistor is sold along with the ID element that is used as a key tag worn by the pet. The requirement to install one specific resistor in the circuit to enable a specific oscillator frequency is a very limiting approach. This invention has no programmability other than by replacing circuit components, and no ability to recognize multiple ID elements. The invention does use a switch connected to the door to turn on the circuit when the door is pressed by an animal, thus providing operation only when necessary.

British Patent No. GB 2,305,211 filed Apr. 2, 1997 entitled Security Locking Circuit discloses a security locking circuit suitable for use with a door latch, with a passive tuned circuit functioning as the key responding to a release signal. The control system is based on a microprocessor and has the ability to learn and recognize multiple individual tuned circuits functioning as ID elements. The means for ID element characterization is dependent on the circuit characterizing and storing whatever resonant signal the ID element generates in response to the transmitted signal. This is a risky method, since there is no control on how well any one specific response signal can be differentiated from the signals generated by other tuned circuits functioning as ID elements. The invention does include power savings through the option of a sleep mode, where an animal pushing against the door would operate a microswitch that would turn the circuit on.

U.S. Pat. No. 5,992,096 filed Nov. 30, 1999 entitled CONTROLLABLE PET ACCESS SYSTEM teaches a controllable pet access system that uses one or more solenoids to unlock a pet door in response to a reader circuit scanning and receiving a signal from a passive ID element described only as an "encoded animal tag" or "encoded pet tag". This invention uses a motion detector to activate the reader circuit, thus requiring constant power for the motion detector. The invention is also lacking programmability or means to identify multiple ID elements.

The most common application for both the radio and non-radio-based animal identification systems is for animal feeders. The majority of the inventions in this field have been for use with livestock, where there are strong economic incentives for controlling feed distribution to each animal in a pasture or similar environment. Pet feeders are a smaller portion of this inventive field, with the primary motivation being convenience.

U.S. Pat. No. 3,465,724 filed Sep. 9, 1969 entitled RECORDING AND/OR CONTROL OF THE FEEDING OF LIVESTOCK and U.S. Pat. No. 3,557,758 filed Jan. 26, 1971 entitled ANIMAL IDENTIFICATION AND CONTROL MEANS both disclose feeding enclosures with access controlled by the interaction of an animal-carried passive tuned circuit ID element with a transformer-type oscillator circuit. Both of these inventions include the output and detection of multiple frequencies to allow for a group of individual ID elements. Both of these inventions use as ID elements tuned analog circuits that must match the output frequencies of the oscillator circuit, and further the location of the ID element on the body of the animal and in relation to the transmitting and receiving coils is critical to the proper function of each of these inventions. These inventions are not turned on by an animal interacting with them but run constantly, and are thus power-inefficient.

U.S. Pat. No. 3,897,753 filed Aug. 5, 1975 entitled MEANS AND METHOD FOR SELECTIVELY CONTROLLING ANIMALS discloses an animal feeder and entry control system which in the primarily illustrated embodiments are intended for use with domestic animals, particularly pet cats. This invention does include both a food dispenser (but not food enclosure) and an enclosure door unlocking function among its embodiments. However, the driver circuit taught by this invention depends on a tuned element's effect on what are effectively the coils of a transformer to produce a change in output and thus identify a specific ID element carried by an animal. The location of the ID element in relation to the receiving coil is critical to the proper function of this invention, but there is no explicit location control taught. Additionally, this invention runs constantly, and thus is power-inefficient. This invention does not teach the use of a microprocessor or other digital device to control frequency generation or other system functions, but does teach the use of multiple ID elements responding to individual excitation frequencies.

U.S. Pat. No. 4,036,178 filed Jul. 19, 1977 entitled ELECTRONIC LOCK AND KEY SYSTEM, a continuation-in-part of U.S. Pat. No. 3,897,753, teaches a more generalized approach to an entry control system, but uses the same inefficient signal generation and detection techniques as the parent patent.

British Patent No. 1,577,023 filed Oct. 15, 1980 entitled APPARATUS FOR CONTROLLING DISPENSING OF FEED TO ANIMALS discloses the use of multiple passive radio frequency ID elements to enable the controlled feeding of multiple animals, but uses numerous feeding stations controlled through a central location.

U.S. Pat. No. 4,463,706 filed Aug. 7, 1984 entitled METHOD AND SYSTEM FOR MONITORING THE DISPENSING OF DRUGS OR NUTRIENTS TO ANIMALS discloses the use of passive radio frequency ID elements carried by the animals to identify individual animals. The ID element contains memory and countdown timer circuitry that is updated by a base radio unit with information as needed. However, much of the circuitry in the animal-carried portion of this invention is actually powered by a battery.

U.S. Pat. No. 4,532,892 filed Aug. 6, 1985 entitled ANIMAL FEEDING AND MONITORING SYSTEM discloses an invention where the element worn by the animal is more than simply a passive radio frequency identification device; it is powered by the electromagnetic signals emitted by the base unit and contains code generating circuitry. This invention also has a control unit that runs continuously, thereby being wasteful of power and a poor choice to be run from batteries.

U.S. Pat. No. 5,309,864 filed May 10, 1994 entitled METHOD AND APPARATUS FOR FEEDING ANIMALS and U.S. Pat. No. 5,740,757 filed Apr. 21, 1998 entitled METHOD AND APPARATUS FOR FEEDING ANIMALS both disclose inventions that use multiple passive radio frequency ID tags to enable the controlled feeding of multiple animals, but both of these inventions have control and frequency generation circuitry that run continuously.

U.S. Pat. No. 6,044,795 filed Apr. 4, 2000 entitled AUTOMATIC FEEDING SYSTEM HAVING ANIMAL CARRIED TRANSMITTER WHICH TRANSMITS FEEDING INSTRUCTIONS TO FEEDER discloses a pet food dispenser using a passive radio frequency ID element worn by the animal. However, this invention lacks any feeding enclosure or any sort of sleep or power-off mode to conserve power. Further, this invention does not offer any user programmability for accepting different ID elements, or the ability to separately identify multiple animals.

U.S. Pat. No. 6,349,671 filed Feb. 6, 2002 entitled PET FEEDING SYSTEM AND METHOD OF USING SAME discloses a pet feeder that uses a passive radio frequency ID element worn by the animal, and that has the ability to identify multiple ID elements worn by multiple animals. However, the food covers are motorized, and the device is continually on. Thus, the invention suffers from both continual battery drain and higher battery use requirements for the motors.

A significant improvement over the existing art would be an animal identification and entry control system that could accurately detect multiple specific animals and could be easily and quickly programmed to recognize other animals when necessary, was powered by batteries and only drew battery power when absolutely necessary, used low-power circuitry for a minimum of battery power drain when in active operation, was durable and weatherproof enough to be used outdoors, was capable of safely limiting access to a single animal at a time, would keep any supply of food and water both fresh and inaccessible to other animals, and was adaptable to entry control for applications including but not limited to entry to a feeding enclosure, entry to a human dwelling, and entry to an animal dwelling.

SUMMARY

In accordance with the present invention, an RFID-based animal identification and entry control system is disclosed. This system is designed to be adaptable to any entry control application suitable for small to medium-sized animals, and is particularly well suited for use with domestic feline cats and small dogs.

The RFID portion of the system uses an RFID tag element suitable for use as a collar tag that may be attached to a regular animal collar. Each separate tag element can be programmed with a unique code, and multiple codes may be programmed, stored and recognized by the RFID system. The means for programming included in the RFID portion of the system is designed to allow the rapid and simple teaching of multiple tag codes.

The RFID means used in the system described hereinafter includes a commercially available digital RFID system including the collar tag elements, each with an individual digital code programmed into the internal memory. A typical system of this type is the Texas Instruments Series 2000 Reader System, which is the preferred system for use with the present invention. Other typical control circuitry preferred for use with this invention includes a microcontroller such as the PIC16F876. The techniques of circuit design, antenna design, printed circuit board layout, integration, programming and general use of the RFID circuitry including the commercially available RFID system, microcontroller and other circuitry disclosed herein are well known to those skilled in the art.

The preferred means for RFID also consists of signal processing circuitry for initial processing of the incoming signal, a door control circuit including a sensing switch, a latch and a solenoid with driver circuitry, and the single antenna coil.

The means for allowing and denying access is a lockable door, configured to block an aperture formed as an animal-sized opening in a boundary surface such as a feeding enclosure, fence, wall or larger door. The preferred means for locking and unlocking the door and thus allowing an animal to pass through is a latch mechanism actuated by a solenoid operated by the control circuitry. The door is located at the end of an entryway defined by a bezel preferably dimensioned to allow only a single animal to enter at a time. The passage length of the bezel and thus of the entryway is preferably no greater than the body length of the general size of animal that the feeder is designed to accomodate. The first end of the entryway is at the aperture, and the second end of the entryway is where an animal initially enters the bezel. In the preferred embodiment, when the door is allowed to open, it does so by swinging upwards and inwards from pivots located at or near the top edge of the door. When the animal that has entered the entryway presses against the outer surface of the locked door, a switch connected to the door is activated, and this in turn serves to turn on the control circuit. This causes the circuitry to generate a signal through the antenna coil that will activate an appropriate RFID tag element if such is within range of the system, causing such an element to send an identifying return signal to be received by the antenna coil.

The antenna coil is preferably located in the bezel that surrounds the entryway, and is preferably shaped into a loop that encircles the inside of the bezel at some distance forward of the door. This serves to create an ideal location relationship between the RFID tag element and the antenna coil at the time when signals are most likely to be transmitted to the tag and then from the tag to the antenna coil. This loop is not necessarily round in shape, but it does need to be wider than both the aperture and the door, and fit inside the confines of the bezel.

If the return signal generated by the RFID tag element and then received by the antenna coil should match with one of the codes stored in the RFID circuitry, the door control circuit will be activated and the solenoid will open the door latch and allow the animal to push the door open and pass through the doorway. As soon as the animal has ceased pushing the door open, the door will pivot shut and latch closed again, preventing any other animals from entering unless they also possess a collar with a recognized RFID tag.

The power source for this entry control system is preferably batteries, but may also be a pluggable DC adapter or direct attachment to the local AC power.

In addition to the basic door function that may be used to control animal entry to a feeding enclosure, the door function may be adapted to other purposes including to control animal entry to or through an animal habitation, a human habitation, or any boundary surface such as a wall, fence or door.

The door function is preferably adapted to control entry to an enclosed feeding chamber by having the bezel be configured to surround an opening in the feeding chamber walls. The preferred design of feeding chamber also will not allow the animal to fully enter, thus preventing any chance of the animal becoming trapped within the feeding chamber if the door closes.

For the door function to work in the best mode with an animal feeder, it is preferable for the animal feeder to operate autonomously with batteries as a power source, thus requiring electronics that have a very low power draw and using power consumption strategies that minimize the length of time when any significant amount of power will actually be drawn. The majority of the RFID circuitry is kept in a default state of minimum-power sleep mode, with a switch connected to the door signaling the circuitry to wake up into active mode when pressure against the door closes the switch contact. After a predetermined length of time without any switch closure, the circuitry will return to sleep mode, thus prolonging battery life.

BRIEF DESCRIPTION OF THE SEVERAL VIEWS OF THE DRAWINGS

A more complete understanding of the invention and its advantages will be apparent from the detailed description taken in conjunction with the accompanying drawings in which.

DETAILED DESCRIPTION

An animal identification and entry control system is provided that permits selected animals to gain entrance through a specific doorway, and bars entry to other animals. The presently disclosed entry control system may be used to control entrance to places including but not limited to an animal feeder, an animal habitation or a human habitation.

Figure 1:
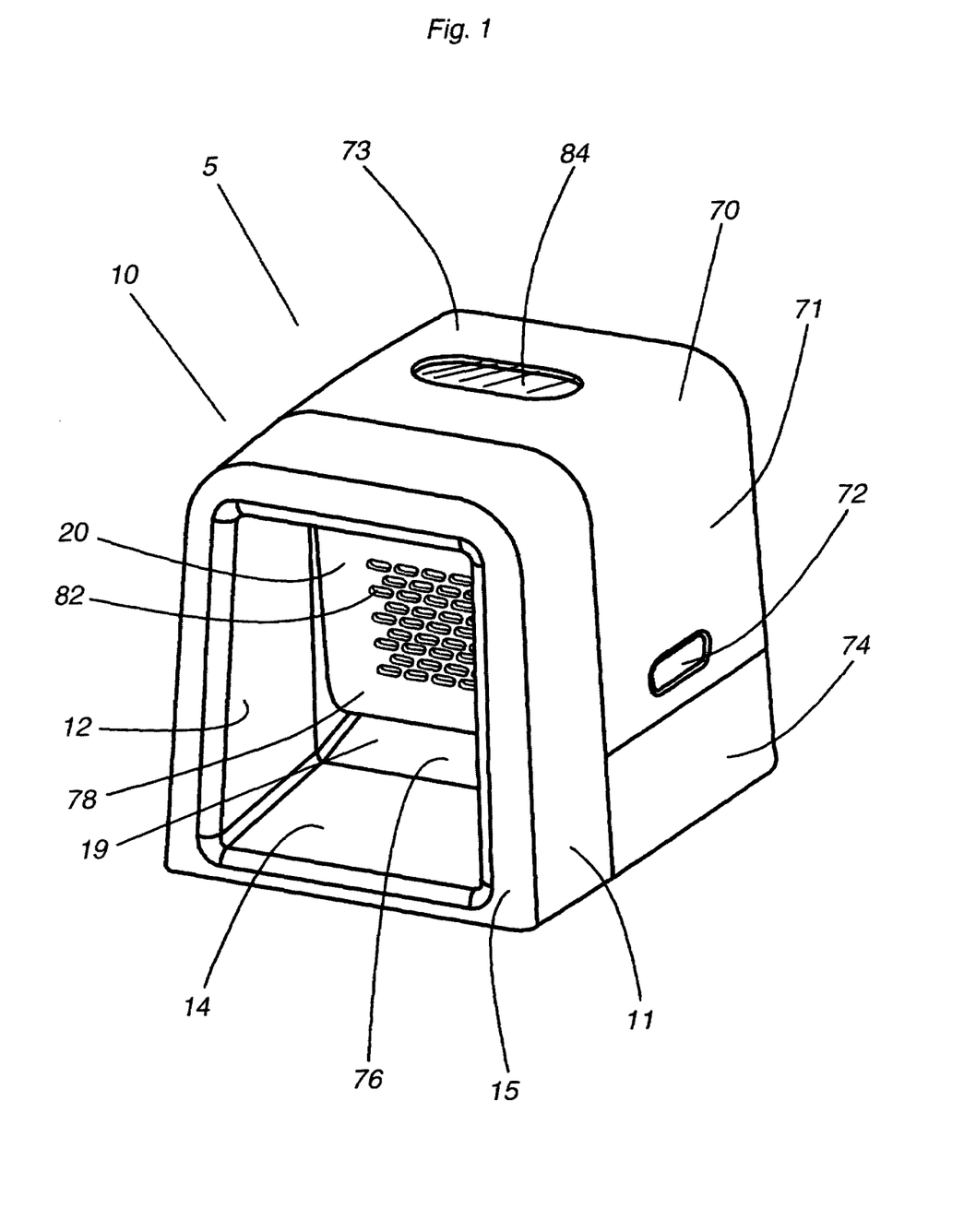
FIG. 1 is a perspective view of the animal feeder.
Figure 2:
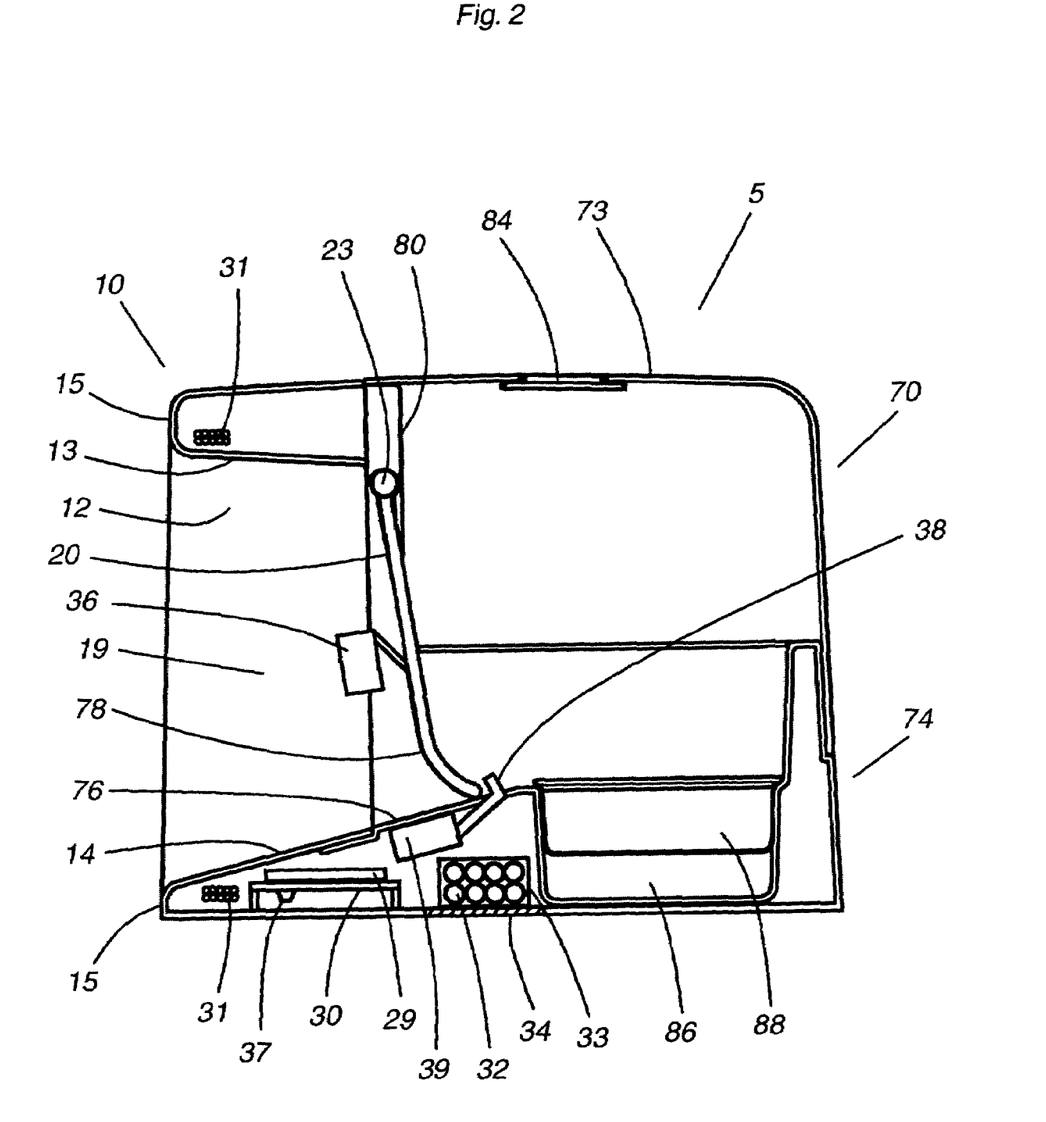
FIG. 2 is a section side view of the feeder.
Figure 7:
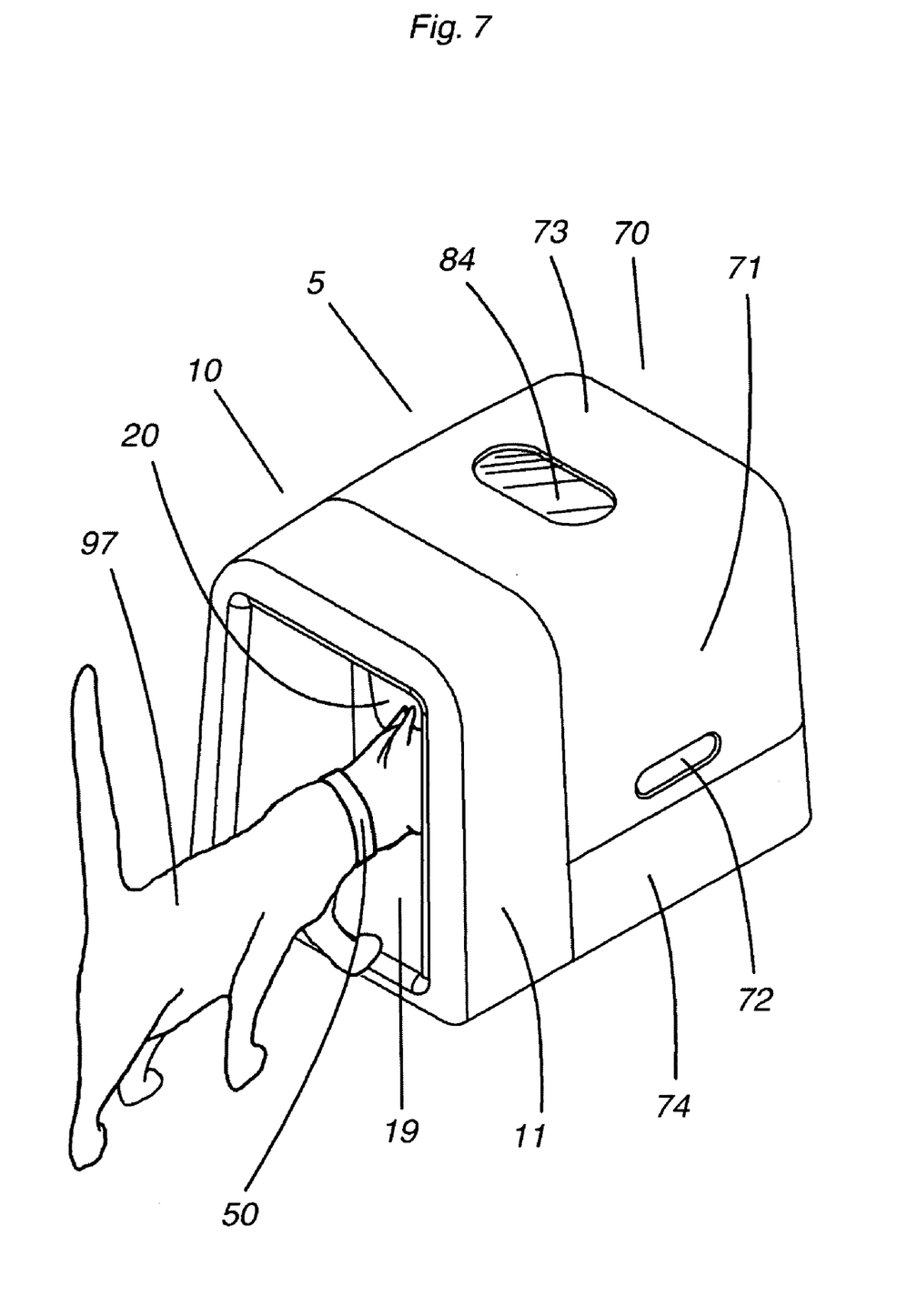
FIG. 7 is a perspective view of the feeder showing a cat entering.
Figure 8:
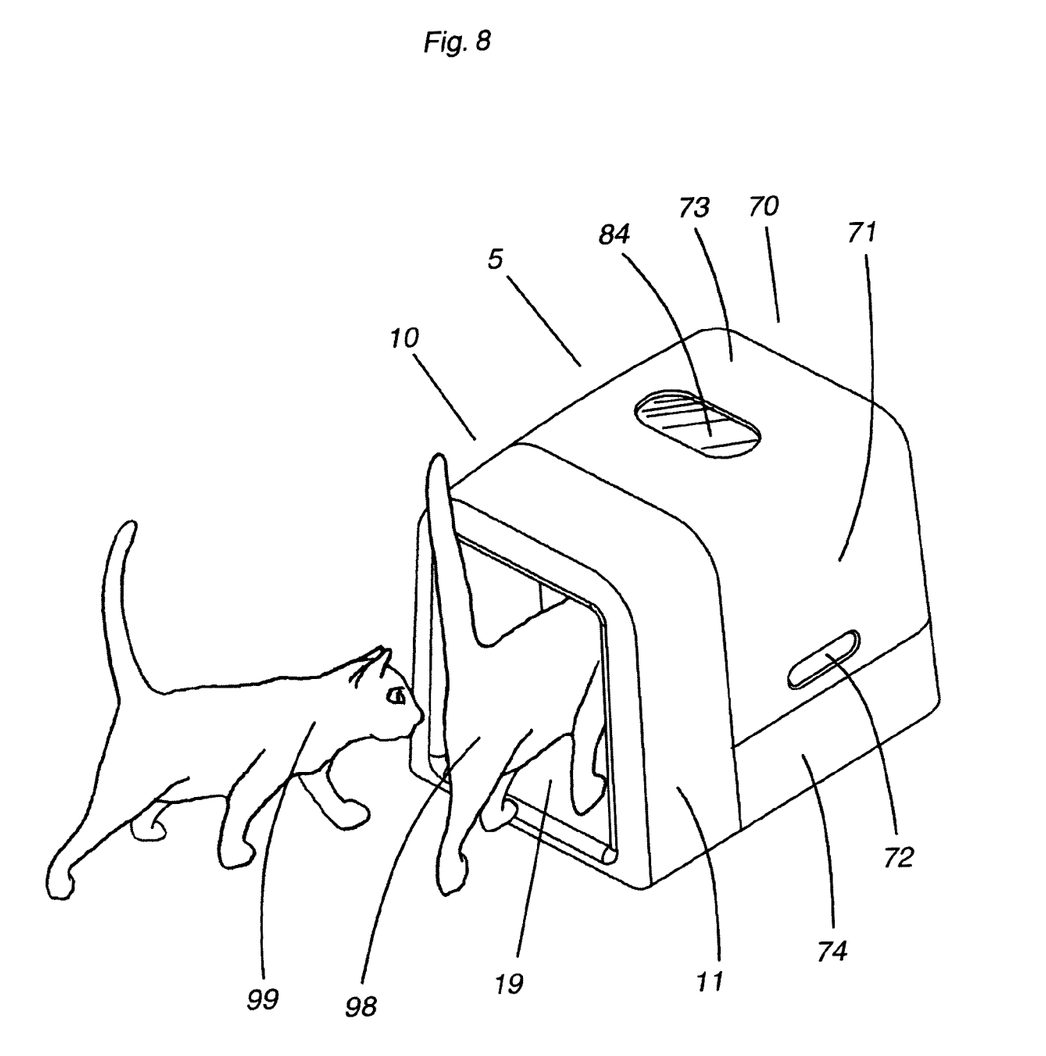
FIG. 8 is a perspective view of the feeder showing a cat feeding and a second cat excluded.

FIG. 1 depicts an illustrative embodiment of an animal feeder 5, in accordance with the present invention. FIG. 7 depicts an animal 97 entering the animal feeder 5, and FIG. 8 depicts an animal feeding 98 while an animal excluded stands outside the animal feeder 5. The animal feeder 5 has a feeding chamber enclosure 70 with a bezel 10 defining an entryway 19. In the preferred embodiment the bezel outer walls 11 form a continuous surface with the chamber enclosure walls 71, chamber enclosure top 73 and chamber enclosure base 74. The bezel fascia 15 preferably defines the contour of the entryway 19, and the bezel inner walls 12 including the bezel ramp 14 as a floor surface and the bezel roof 13 (as shown in FIG. 2) define the overall dimensions of the preferred embodiment of the entryway 19. The back of the entryway 19 is bounded by the bezel secondary ramp 76 and the door 20. The location of the door 20 thus defines the passage length of the bezel 20 and the entryway 19. As seen in FIG. 7, this passage length is preferably at least sufficient to allow the head and shoulders of one animal 97 to be inside the entryway 19 before the door 20 is opened. In the preferred embodiment the door 20 is angled inwards down from the door pivot 23 towards the feeding chamber enclosure 70 to require less travel when opening and to have a more positive closure than would be gained from hanging vertically. Other door attachment and hinging mechanisms may be employed, but the use of gravity to close the door 20 produces a simple and economical mechanism. Alternative mechanisms using one or more springs may also be employed to yield a more forceful closure. The door 20 also includes a curved door bottom 78 and airholes 82, and is secured to the bezel 10 by a door retainer 80 in a manner that permits the door pivot 23 to serve as a hinge, such that the door 20 will swing upwardly and inwardly when pressed upon by an animal 97 in the entryway 19. The airholes 82 permit the odor of any contents of the food pan 88 to propagate outwards from the animal feeder 5 to attract the animal 97. The airholes 82 are preferably located in the door 20 to attract the animal 97 to the outward surface of the door 20.

The preferred embodiment door 20 is shaped with the curved door bottom 78 to prevent any portion of the collar 50 from catching on or becoming entangled in any portion of the door 20. The curved door bottom 78 will preferably rest on the shoulders or back of the animal feeding 98 when the animal feeder 5 has been successfully entered. It is preferable for the dimensions of the feeding chamber enclosure 70 to orient the animal feeding 98 to have a portion of the door 20 resting on the animal's shoulders so that the animal feeding 98 is most fully blocking the entryway 19. The preferred curvature of the curved door bottom 78 is between 18 mm and 65 mm radius, with an arc section of between 30 degrees and 75 degrees. Optionally, the door 20 may be made of transparent material so that the animal 97 may see into the feeding chamber enclosure 70 before pressing against the door 20.

The preferred embodiment of the animal feeder 5 has the feeding chamber enclosure 70 formed as a single chamber as shown in FIG. 2 and dimensioned to prevent animals from completely entering the feeding chamber enclosure 70 and thus possibly becoming trapped if the door 20 closes behind them. Such an animal feeding is shown in FIG. 8. with only the front portion of the animal in the feeding chamber. The animal feeder 5 is preferably designed to be used by domestic feline cats or small dogs of between 2 kilos and 10 kilos weight, where weight is used as an approximation of overall animal size. A larger version of the system can be built for animals over 20 kilos such as medium-sized dogs.

Figure 5:
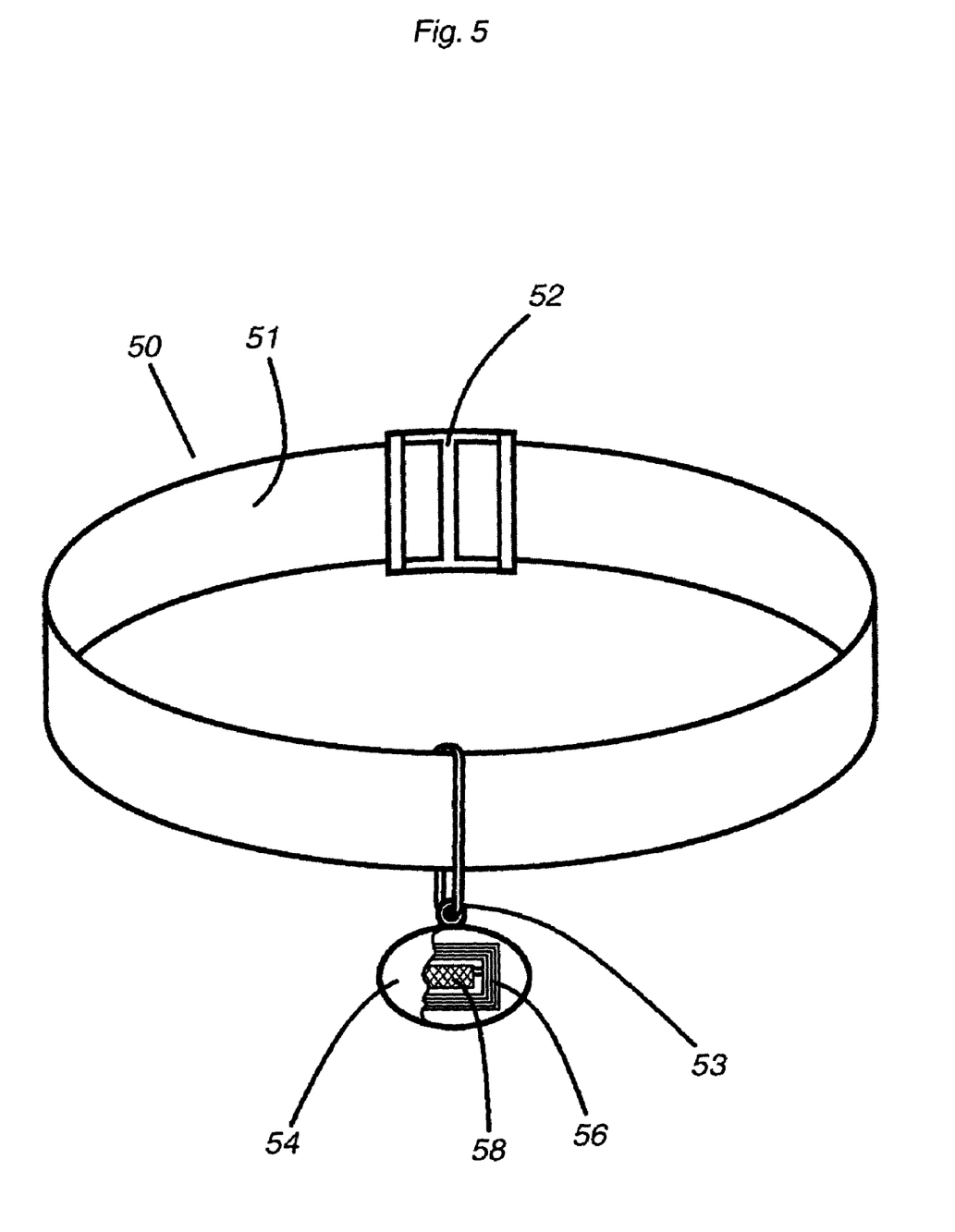
FIG. 5 is a detailed view of the animal collar and the attached RFID tag.

The bezel 10 is preferably dimensioned such that only one animal 97 in the intended size range can fit inside the entryway 19 at once. The bezel 10 also limits the animal's angle of approach to the feeding chamber enclosure 70, making it more difficult for a second animal to try to squeeze in beside the animal feeding 98, as shown in FIG. 8. where there is an animal feeding 98 and an animal excluded 99. In the preferred embodiment, the animal 97 is wearing a collar 50, preferably of a standard animal collar band 51 style with a collar fastener 52 for ease of attachment and removal, and an RFID tag element 54, preferably attached with an RFID tag fastener 53 as illustrated in FIG. 5. If the animal 97 enters the bezel 10 and presses against the door 20, the resulting movement of the door 20 before being stopped by the door latch 38 causes closure of the door switch 36, located inside the bezel 10. This door switch 36 actuation triggers the "GO" input shown in FIG. 3, the flowchart of control board 30 containing control circuitry 29, and related component function.

Figure 3:
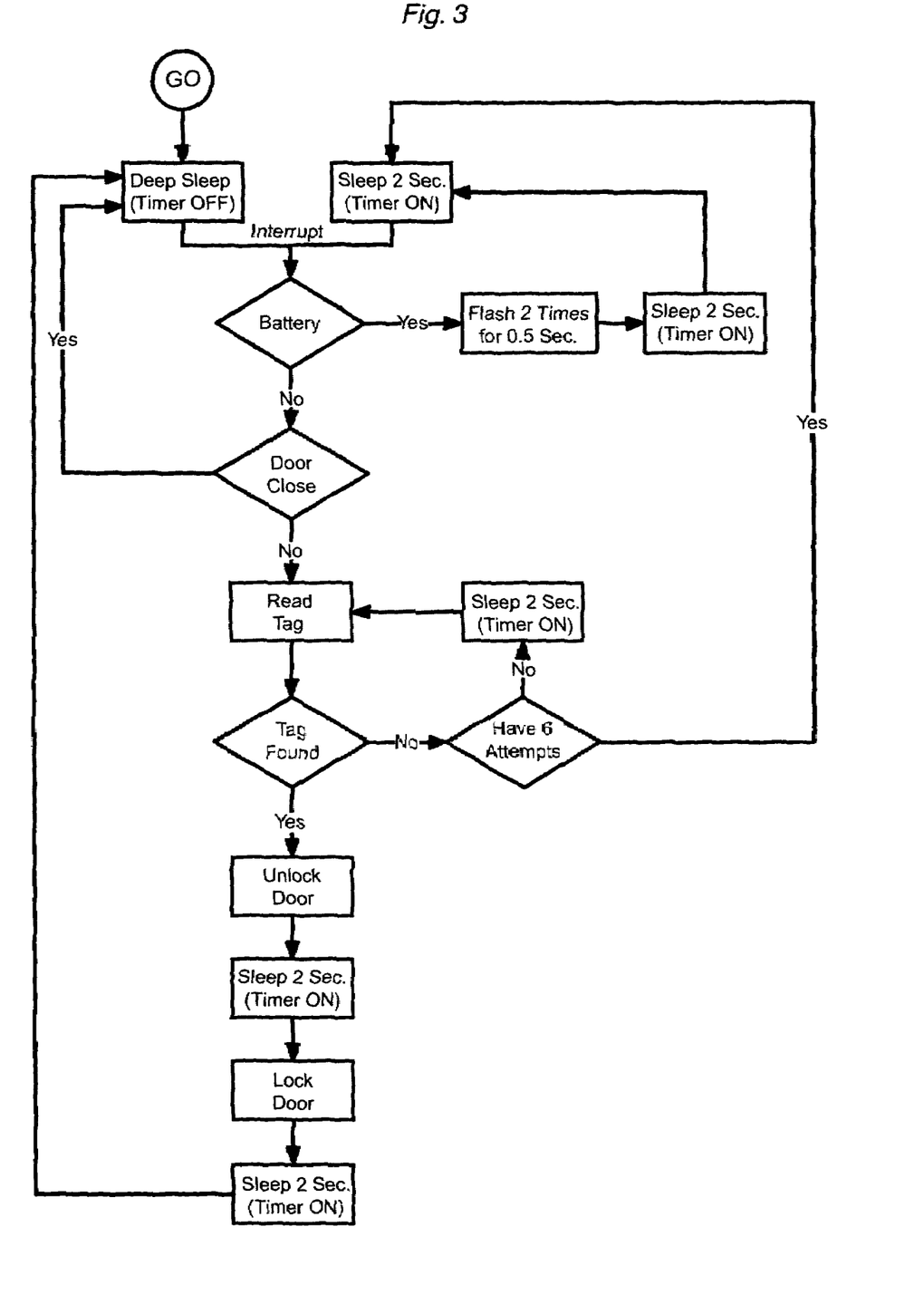
FIG. 3 is a flowchart of circuit function and system operation.
Figure 4:
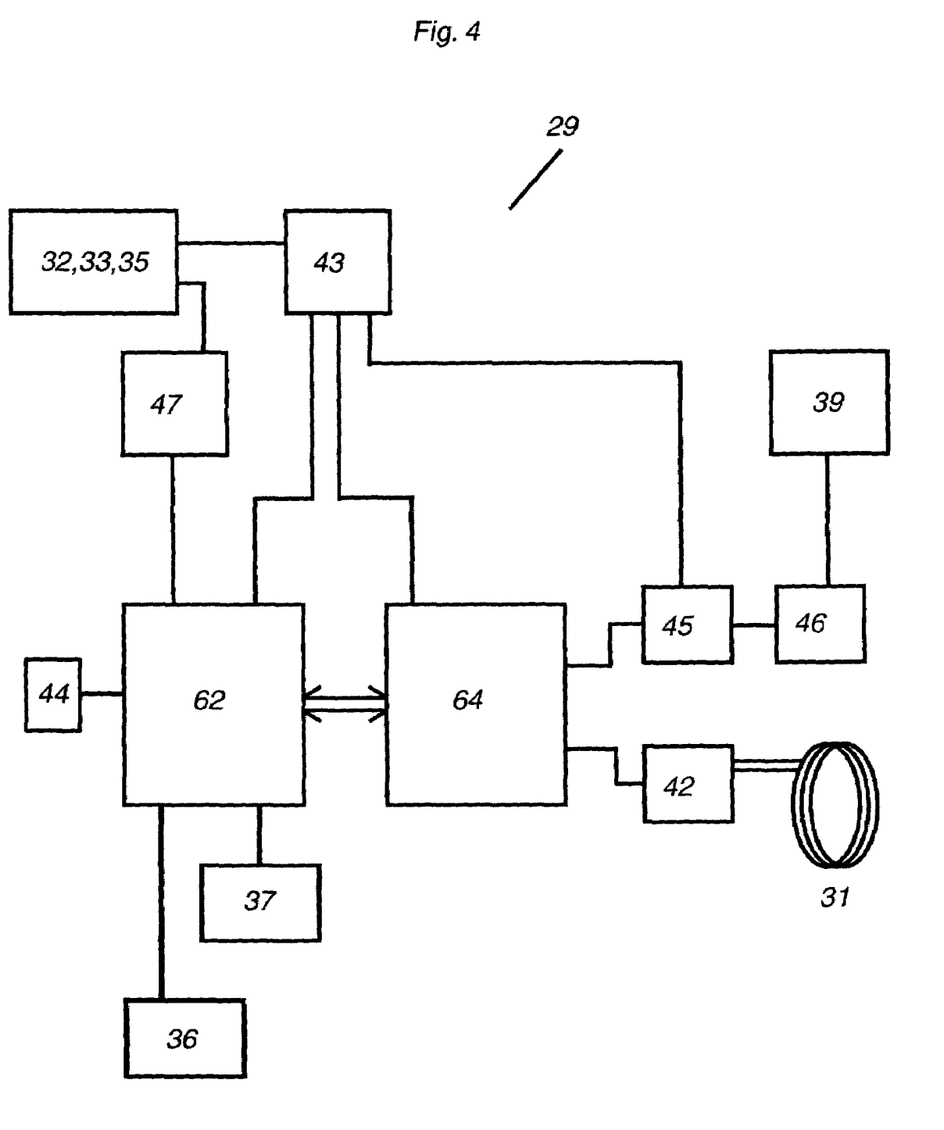
FIG. 4 is a block diagram of the circuit including the control and signal circuitry.

The system response to a door switch 36 closure is initially to activate and awaken the microcontroller 62 shown in FIG. 4 into the active state. The preferred first action by the awakened microcontroller 62 is to check the level of the batteries 32 using the circuit element DC Converter & Low Battery Comparator 47, which if the voltage of the batteries 32 is above the set Low Battery threshold, leads to checking the door 20 status. If the door 20 is still being pressed upon and thus the switch 36 is still activated, then the microcontroller 62 will instruct the RFID Module 64 to produce an interrogation signal that will be sent through the antenna connector 42 to be broadcast by the antenna coil 31. The combination of functions provided by the microcontroller 62, the RFID module 64 and the circuitry enabling them to function together provide the RFID sensor means required for the system.

If the animal 97 pressing against the door 20 is wearing a collar 50 with an RFID tag element 54, then the RFID antenna 56 will receive the interrogation signal and the interrogation signal will supply power to the RFID circuitry 58 and will be processed by the RFID tag circuitry 58 in such a fashion as to trigger a digital code output from an onboard memory register. The RFID tag circuitry 58 will then transmit this digital code back through the RFID antenna 56.

If the animal 97 is within the bezel 10 when the digital code is transmitted, then the antenna coil 31 will receive the digital code and transmit the digital code through the antenna connector 42 to the RFID module 64, where it will be compared with programmed codes stored in the RFID module 64 memory. If there is a match between a stored code and the digital code received from the RFID tag element 54, then the RFID module 64 will signal the microcontroller 62 to activate the solenoid drive circuitry 45 and through the solenoid connector 46 activate the solenoid 39 to unlock the door latch 38 and thus allow the animal 97 to push the door 20 open. The microcontroller 62 and related circuitry contain a means for timekeeping, and after some programmed time increment, the microcontroller 62 will deactivate the solenoid drive circuitry and through the solenoid connector 46 deactivate the solenoid 39 and thus lock the door latch so that if the door is in the shut position or when the door is returned to the shut position, it will re-lock. If there is then no closure detected of the door switch 36, the microcontroller 62 and the RFID module 64 will return to a sleep state and then to Deep Sleep as labeled in the flowchart of FIG. 3, this default operational state drawing a nonzero but minimum amount of power and thus maximizing the conservation of battery life.

If the DC Converter & Low Battery Comparator 47 measures battery voltage below the Low Battery Threshold, a Low Battery LED 44 will flash periodically, thus alerting the need to change the batteries 32. The batteries 32 are held in a battery holder 33 that is preferably secured within the chamber enclosure base 74 and accessed through the battery lid 34. The batteries 32 are electrically connected to the circuitry of the control board 30 through the battery connector 35. Alternatively, the animal feeder may be powered from household AC, using a DC converter, or may be direct-wired into the household AC wiring, with appropriate onboard power conversion circuitry. Appropriate supply voltages for the microcontroller 62, the RFID module 64 and the other circuitry are provided through the voltage regulator 43.

Figure 6:
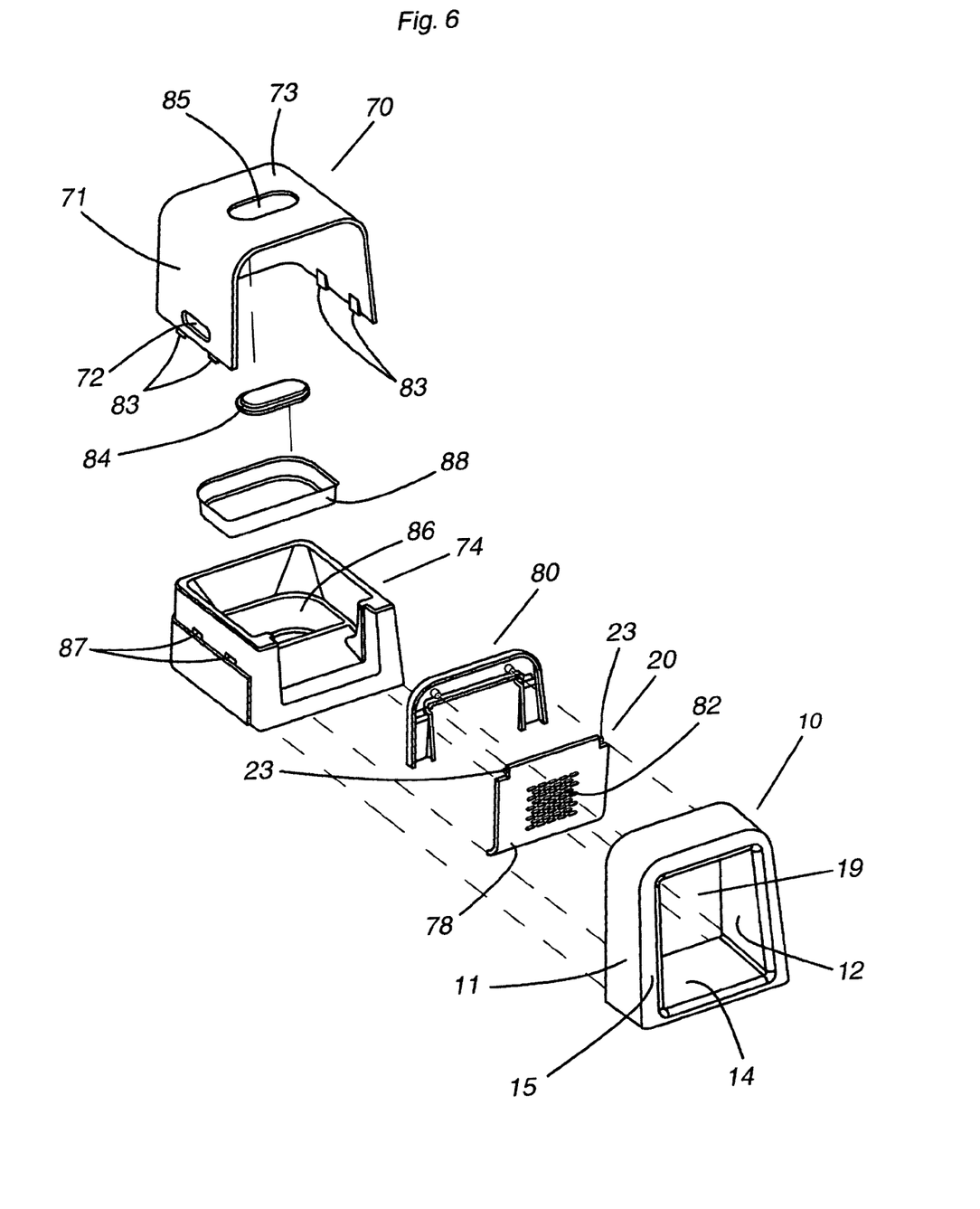
FIG. 6 is an exploded perspective view of the animal feeder's main mechanical parts.

The preferred embodiment animal feeder 5 contains a food pan 88 designed to hold any appropriate type of nutritional materials such as food or water, located within a food pan recess 86 formed into the chamber enclosure base 74. The preferred embodiment feeding chamber enclosure 70 is molded of plastic material and is removably snapfitted onto the chamber enclosure base 74, also preferably molded of plastic material. Snapfits function here as a cost-effective form of mechanical latch. The male snapfits 83 as shown in FIG. 6 are preferably formed into the body of the feeding chamber enclosure 70, and the female snapfits 87 are preferably formed into the body of the chamber enclosure base 74. The food pan 88 is preferably formed of a durable, cleanable and food-safe material such as stainless steel, and is designed to be easily removed from the food pan recess 86 for cleaning and filling. Side handles 72 are preferably formed into the chamber enclosure walls 71 both to aid in removing the feeding chamber enclosure 70 from the chamber enclosure base 74 and to aid in lifting and moving the entire assembled animal feeder 5. There is preferably an open space below the food pan 88 within the food pan recess 86, into which can be placed cooling means for the food contents of the food pan 88. For use outdoors, the animal feeder 5 may include fastening mounts and hardware that allow it to be fastened to the ground or other underlying surfaces. Alternatively, the animal feeder may be equipped with rubber feet or other high-friction means to prevent movement when pressed against by an animal or other external force, either indoors or outdoors.

The chamber enclosure top portion 73 in the preferred embodiment serves as a roof and has a top opening 85 into which a skylight 84 preferably formed of transparent or translucent plastic may be fitted. The skylight 84 permits light to enter the feeding chamber enclosure 70, and facilitates viewing the contents and interior of the feeding chamber enclosure 70.

FIG. 8 shows the animal feeder 5 with an animal feeding 98 located inside the bezel 10 and the feeding chamber enclosure 70, and an animal excluded 99 located outside the animal feeder 5 and unable to gain entry due to the location of the animal feeding 98 and the shape of the bezel 10 and the entryway 19.

The unique identification codes of one or more RFID tag elements 54 may be programmed into the control circuitry 29 for recognition. An RFID tag element 54 is held near the antenna coil 31 and the programming button 37 is pressed.

This procedure may be repeated for as many RFID tag elements 54 as the RFID module 64 and the microcontroller 62 are capable of recognizing.

In addition to the entry control functions described above, there are other functions that can be programmed into the control circuitry 29. One optional function is a timer implemented in either hardware, software or a combination of both, that is designed to be programmed by the animal owner to only allow access to the feeder during set times, where different set permitted entry times can be programmed for each different animal wearing an RFID tag element. Optionally, this timer function may be used in place of the RFID sensing system as a method of controlling entry to the feeder.

Another optional function allows the storage and display of access information, thus enabling the animal owner to have a record of when and how often the door switch 36 has been actuated, how often each animal has accessed the feeder, and how long each animal spent in each feeding session.

Yet another optional function allows the animal feeder 5 to be programmed to only allow a set number of accesses for each recognized RFID tag element 54 per day.

An alternate method of securing the RFID tag element 54 to an animal is to use well-known permanent physical attachments including but not limited to ear tags. A further alternate method of securing the RFID tag element 54 to an animal is to implant the RFID tag element 54 within the body of an animal.

An alternate embodiment of the door switch 36 is located beneath a portion of the bezel ramp 14 or bezel secondary ramp 76, the ramps effectively serving as a bezel floor, and the switch is configured to actuate from the weight of an animal treading upon the floor surface.

An alternate embodiment of the animal feeder has the feeding enclosure manufactured as a unitary structure with no base included. This version would still have the feeding chamber dimensioned to prevent complete entry by an animal, and the bezel and entryway dimensioned to restrict access to a single animal at a time.

Another alternate embodiment of the animal feeder includes a storage container for a supply of animal food, preferably at least one day's worth, and a dispensing mechanism for dispensing the food from the storage container into the feeding chamber at set intervals of time, or when a sensor indicates that replenishing is needed. A preferred method for controlling the dispensing mechanism would have the time intervals and control signals originate in the control circuitry.

Yet another alternate embodiment of the animal feeder has no electronics, and is merely a feeding enclosure with an entry bezel shaped to restrict access to a single animal at a time and to prevent complete entry by the animal, thus preventing the animal from either becoming trapped or using the feeding enclosure as a hiding place. This version may be made with or without the pivoting door with air holes and a curved bottom section.

Further alternate embodiments of the RFID-enabled animal identification and entry control invention may be used to control entrance to locations other than animal feeders. For example, an embodiment of the invention could be used to control entry to an animal habitation or to a human habitation, or could be used for controlling passage through any boundary surface such as a wall, fence or door.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. An animal feeding device having electronic identification and feed control comprising:
    an enclosed feeding chamber having a single aperture therethrough permitting animal entry into said feeding chamber;
    a bezel attached about said aperture and extending outwardly therefrom and substantially transversely thereto with an interior volume of said bezel defining a single entryway into said feeding chamber, said entryway dimensioned for entry into said feeding chamber by only one animal at a time, of an intended size range;
    a door having a pivotal attachment within said feeding device in proximity to said aperture, said door having a closed position blocking said aperture;
        said door in said closed position defining the length of said entryway and thus the length of said bezel;
            said length of said entryway and said length of said bezel being at least equal to a length measured from the shoulders of said animal forward to the tip of the nose of said animal, and no longer than the total length of said animal;
        said door further being pivotally attached to said feeding device in proximity to the upper boundary of said aperture;
        said door being upwardly and inwardly pivotable into said feeding chamber if unlocked and pressed upon from outside said feeding chamber;
        said door further comprising an upper substantially flat portion and a lower curved portion joined together, said lower curved portion curving inwardly towards said feeding chamber with a radius of curvature between 18 mm and 65 mm, spanning an arc section of between 30 degrees and 75 degrees, thereby when said door is upwardly and inwardly pivoted, said lower curved portion preventing objects from catching on said door;
    locking means for locking and unlocking said door and operable between a locked condition and an unlocked condition, said locking means, with said door closed, operable to a locked position and, with said lock in an unlocked condition enabling said door to be opened;
    radio frequency identification (RFID) sensor means configured to function cooperatively with an RFID-tagged animal;
        said RFID sensor means including at least one antenna element positioned forward of said aperture and formed into at least one loop to circumferentially surround said entryway; and
    said RFID sensor means actuating said locking means thereby permitting access to said feeding chamber by said RFID-tagged animal.

2. The animal feeding device as set forth in claim 1 wherein said feeding chamber comprises one or more chamber walls disposed substantially vertically;
    a single aperture therethrough in said one or more chamber walls, said aperture permitting entry to said feeding chamber; and
    a roof portion disposed atop and disposed contiguous with the upper edges of said one or more chamber walls.

3. The animal feeding device as set forth in claim 2, further comprising;
 a base having a perimeter in detachable mechanical communication with said one or more chamber walls;
  said detachable mechanical communication comprising at least one mechanical latch; and
 said base shaped at least in part to retain nutritional materials.

4. The animal feeding device as set forth in claim 3 wherein said base includes at least one compartment for holding means for cooling said nutritional materials.

5. The animal feeding device as set forth in claim 1 including at least one transparent or translucent portion thereby permitting the entry of light into said feeding chamber and the viewing of the contents of said feeding chamber.

6. The animal feeding device as set forth in claim 1 wherein said feeding chamber is a single compartment dimensioned to prevent complete entry by animals.

7. The animal feeding device as set forth in claim 1 wherein at least a portion of said feeding device includes airholes thereby permitting the odor of any nutritional materials contained within said feeding chamber to outwardly propagate.

8. The animal feeding device as set forth in claim 1 wherein at least a majority of the components are composed substantially of injection-molded plastic materials.

9. The animal feeding device as set forth in claim 1 further comprising:
 said door having an inward surface substantially facing said feeding chamber and an outward surface substantially facing away from said feeding chamber;
 a switch in mechanical communication with said door, said switch actuated by pressure against said outward surface of said door, said switch further in electrical communication with said RFID sensor means;
 wherein at least a portion of said RFID sensor means further has at least two operational states wherein the first operational state is a minimum-power sleep state and the second operational state is an active state enabling full function of said RFID sensor means;
  wherein said minimum-power sleep state draws a non-zero but minimum amount of power;
   wherein the default operational state of said RFID sensor means is said minimum-power sleep state thereby providing minimum power consumption for said system; and
 wherein said RFID sensor means is further configured such that if said switch is actuated then said RFID sensor means is brought out of said minimum-power sleep state into said active state, said RFID sensor means further including timekeeping means such that after an increment of time from an event such as the actuation of said switch, said RFID sensor means returns to said minimum-power sleep state, thereby conserving power.

10. The animal feeding device as set forth in claim 9 wherein said RFID sensor means includes storage and display means for the data associated with each actuation of said switch and subsequent activity of said RFID sensor means.

11. The animal feeding device as set forth in claim 9 wherein said bezel includes a floor surface; and
 wherein said switch is in mechanical communication with at least a portion of said floor surface, said switch being actuated by the weight of an animal treading upon said floor surface.

12. The animal feeding device as set forth in claim 1 wherein said RFID sensor means includes programming means enabling said RFID sensor means to function cooperatively with at least one chosen RFID-tagged animal.

13. The animal feeding device as set forth in claim 1 wherein said RFID sensor means functions cooperatively with multiple chosen RFID-tagged animals.

14. The animal feeding device as set forth in claim 13 wherein said RFID sensor means includes programming means allowing cooperative functioning with multiple chosen RFID-tagged animals at different programmed times.

15. The animal feeding device as set forth in claim 1 wherein said locking means comprises a latch in mechanical communication with said door and a solenoid in mechanical communication with said latch; and
 wherein said RFID sensor means further includes solenoid actuating means.

16. The animal feeding device as set forth in claim 1 wherein said RFID sensor means further comprises a power source consisting of at least one battery.

17. The animal feeding device as set forth in claim 16 wherein said power source comprises a DC power supply adapted to be plugged into a standard AC wall socket.

18. The animal feeding device as set forth in claim 1 further comprising:
 food storage means configured to store at least one day's supply of animal food;
 dispensing means in mechanical communication with said food storage means, said dispensing means configured to dispense animal food into said feeding chamber, said dispensing means in electronic communication with said RFID sensor means;
 said RFID sensor means further comprising food dispensing timing means capable of signaling said dispensing means to dispense animal food into said feeding chamber.

19. The animal feeding device as set forth in claim 1 further comprising fastening means to secure said device to the ground or other underlying surface.

20. The animal feeding device as set forth in claim 1, wherein said closed position is configured to orient said door to slope inwardly towards said feeding chamber from said pivotal attachment.

21. An animal feeding device having electronic identification and feed control comprising:
 an enclosed feeding chamber comprising one or more chamber walls rising substantially vertically, said one or more chamber walls having a single aperture therethrough permitting animal entry into said feeding chamber, said feeding chamber being a single compartment dimensioned to prevent complete entry by animals of an intended size range;
 a base having a perimeter in detachable mechanical communication with said one or more chamber walls;
  said detachable mechanical communication comprising at least one mechanical latch;
  said base further shaped at least in part to retain nutritional materials and capable of holding means for cooling said nutritional materials;
 a roof portion disposed atop and disposed contiguous with the upper edges of said one or more chamber walls, said roof portion further including a portion made of transparent or translucent material thereby permitting the entry of light into said feeding chamber;
 a bezel attached about said aperture and extending outwardly therefrom and substantially transversely thereto with an interior volume of said bezel defining a single entryway into said feeding chamber, said entryway dimensioned for entry to said feeding chamber by only one animal at a time, of an intended size range;

said feeding device preferably formed of injection-molded plastic or low cost, easily formed and durable material, and wherein at least a portion of said feeding device includes airholes providing ventilation and permitting the odor of any nutritional materials contained within said feeding chamber to outwardly propagate;

a door pivotally attached within said feeding device in proximity to the upper boundary of said aperture, said door having a closed position substantially blocking said aperture, said door upwardly and inwardly pivotable into said feeding chamber if unlocked and pressed upon from outside said feeding chamber;

said closed position configured to orient said door to slope inwardly towards said feeding chamber from said pivotal attachment;

said door further comprising an upper substantially flat portion and a lower curved portion joined together, said door further having an inward surface substantially facing said feeding chamber and an outward surface substantially facing away from said feeding chamber;

said lower curved portion curving inwardly towards said feeding chamber with a radius of curvature between 18 mm and 65 mm, spanning an arc section of between 30 degrees and 75 degrees, thereby when said door is upwardly and inwardly pivoted, said lower curved portion preventing objects from catching on said door;

a latch in mechanical communication with said door and operable between a locked condition and an unlocked condition, said latch, with said door closed, operable to a locked position and, with said latch in an unlocked condition enabling said door to be opened;

said door in said closed position defining the length of said entryway and thus the length of said bezel;

said length of said entryway and said length of said bezel being at least equal to a length measured from the shoulders of said animal to the tip of the nose of said animal, and no longer than the total length of said animal;

a solenoid in mechanical communication with said latch, said solenoid operating said latch between a locked condition and an unlocked condition;

radio frequency identification (RFID) sensor means configured to function cooperatively with an RFID-tagged animal, said RFID sensor means actuating said solenoid thereby permitting access to said feeding chamber by said RFID-tagged animal;

said RFID sensor means further including at least one antenna element, said antenna element positioned forward of said aperture and formed into at least one loop to circumferentially surround said entryway;

a switch in mechanical communication with said door, said switch actuated by pressure against said outward surface of said door, said switch further in electrical communication with said RFID sensor means;

wherein at least a portion of said RFID sensor means further has at least two operational states wherein the first operational state is a minimum-power sleep state and the second operational state is an active state enabling full function of said RFID sensor means;

wherein said minimum-power sleep state draws a non-zero but minimum amount of power;

wherein the default operational state of said RFID sensor means is said minimum-power sleep state thereby providing minimum power consumption for said system;

wherein said RFID sensor means is further configured such that if said switch is actuated then said RFID sensor means is brought out of said minimum-power sleep state into said active state, said RFID sensor means further including timekeeping means such that after an increment of time from an event such as the actuation of said switch, said RFID sensor means returns to said minimum-power sleep state, thereby conserving power.

* * * * *